United States Patent
Kanj et al.

(10) Patent No.: US 8,954,121 B2
(45) Date of Patent: Feb. 10, 2015

(54) RADIATION PATTERN RECOGNITION SYSTEM AND METHOD FOR A MOBILE COMMUNICATIONS DEVICE

(75) Inventors: Houssam Kanj, Waterloo (CA); Shirook Ali, Waterloo (CA); Huanhuan Gu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 52 days.

(21) Appl. No.: 13/880,412

(22) PCT Filed: Nov. 26, 2010

(86) PCT No.: PCT/CA2010/001864
§ 371 (c)(1),
(2), (4) Date: Apr. 19, 2013

(87) PCT Pub. No.: WO2012/068660
PCT Pub. Date: May 31, 2012

(65) Prior Publication Data
US 2013/0217450 A1     Aug. 22, 2013

(51) Int. Cl.
*H04M 1/00* (2006.01)
*H04M 1/02* (2006.01)
(Continued)

(52) U.S. Cl.
CPC ............ *H04M 1/0202* (2013.01); *H04W 24/02* (2013.01); *H01Q 1/242* (2013.01); *H01Q 1/52* (2013.01); *H01Q 3/2611* (2013.01); *H01Q 21/293* (2013.01); *H04W 88/06* (2013.01)
USPC ...................................................... 455/575.7

(58) Field of Classification Search
CPC ................................................... H01Q 1/242
USPC ........................................................ 455/575.7
See application file for complete search history.

(56) References Cited

U.S. PATENT DOCUMENTS

| 5,524,275 A | 6/1996 | Lindell |
| 6,031,495 A | 2/2000 | Simmons et al. |

(Continued)

FOREIGN PATENT DOCUMENTS

| CA | 2746881 | 1/2012 |
| EP | 0827287 | 3/1998 |

(Continued)

OTHER PUBLICATIONS

EPO, Communication of European publication number and information on the application of Article 67(3) EPC, Application No. 12787600.1, Jun. 4, 2014, 1 pg.

(Continued)

*Primary Examiner* — David Bilodeau
(74) *Attorney, Agent, or Firm* — The Danamraj Law Group, P.C.

(57) ABSTRACT

A radiation pattern recognition system and method for a wireless user equipment (UE) device wherein a set of benchmark radiation patterns are matched based on the wireless UE device's usage mode. In one aspect, the wireless UE device includes one or more antennas adapted for radio communication with a telecommunications network. A memory is provided including a database of benchmark radiation patterns for each of the one or more antennas in one or more usage modes associated with the wireless UE device. A processor is configured to execute an antenna application process for optimizing performance of the wireless UE device based at least in part upon using the matched set of benchmark radiation patterns.

28 Claims, 6 Drawing Sheets

(51) Int. Cl.
*H04W 24/02* (2009.01)
*H01Q 1/24* (2006.01)
*H01Q 1/52* (2006.01)
*H01Q 3/26* (2006.01)
*H01Q 21/29* (2006.01)
*H04W 88/06* (2009.01)

(56) References Cited

U.S. PATENT DOCUMENTS

| | | | |
|---|---|---|---|
| 6,985,113 | B2 | 1/2006 | Nishimura et al. |
| 7,146,139 | B2 | 12/2006 | Nevermann |
| 7,330,705 | B2 | 2/2008 | Lee |
| 7,609,171 | B2 | 10/2009 | Haapoja et al. |
| 7,610,027 | B2 | 10/2009 | Alapuranen |
| 7,847,741 | B2 * | 12/2010 | Hirota ............ 343/702 |
| 8,483,632 | B2 | 7/2013 | Asrani et al. |
| 8,565,205 | B2 | 10/2013 | Ho et al. |
| 8,731,496 | B2 | 5/2014 | Drogi et al. |
| 8,744,539 | B2 | 6/2014 | Pourseyed et al. |
| 8,781,437 | B2 | 7/2014 | Ngai et al. |
| 8,798,664 | B2 | 8/2014 | Yun |
| 2005/0113103 | A1 | 5/2005 | Snowden et al. |
| 2005/0113125 | A1 | 5/2005 | Kang |
| 2007/0037619 | A1 * | 2/2007 | Matsunaga et al. ........ 455/575.7 |
| 2007/0111681 | A1 | 5/2007 | Alberth, Jr. et al. |
| 2007/0216584 | A1 | 9/2007 | Nishikido et al. |
| 2009/0047998 | A1 | 2/2009 | Alberth |
| 2011/0014879 | A1 * | 1/2011 | Alberth et al. ................ 455/75 |
| 2011/0222469 | A1 | 9/2011 | Ali et al. |
| 2012/0077538 | A1 | 3/2012 | Yun |
| 2012/0190398 | A1 | 7/2012 | Leukkunen |
| 2012/0270592 | A1 | 10/2012 | Ngai et al. |
| 2013/0122827 | A1 | 5/2013 | Ali et al. |
| 2013/0252658 | A1 | 9/2013 | Wilson et al. |
| 2013/0310105 | A1 | 11/2013 | Sagae et al. |
| 2014/0248892 | A1 | 9/2014 | Wilson et al. |

FOREIGN PATENT DOCUMENTS

| | | |
|---|---|---|
| EP | 0843421 | 5/1998 |
| EP | 1248379 | 10/2002 |
| EP | 1298809 | 4/2003 |
| EP | 1524774 | 4/2005 |
| EP | 2410661 | 1/2012 |
| KR | 20020052442 | 7/2002 |
| KR | 100663518 | 1/2007 |
| WO | 0205443 | 1/2002 |
| WO | 03013020 | 2/2003 |
| WO | 2008076024 | 6/2008 |
| WO | 2012068660 | 5/2012 |
| WO | 2013074295 | 5/2013 |

OTHER PUBLICATIONS

CIPO, Notice of Allowance, Application No. 2,746,881, Jul. 3, 2014, 1 pg.

USPTO, Notice of Publication of Application, U.S. Appl. No. 14/278,051, Sep. 4, 2014, 1 pg.
USPTO, Notice of Allowance and Fees Due, U.S. Appl. No. 13/898,098, Mar. 31, 2014, 8 pgs.
EPO, Communication pursuant to Rules 161(1) and 162 EPC, Application No. 12787600.1, May 12, 2014, 2 pgs.
EPO, Communication under Rule 71(3) EPC Intention to Grant, Application No. 10170152.2, May 26, 2014, 3 pgs.
EPO, Communication Pursuant to Rules 161(2) and 162 EPC, Application No. 10860032.1, Jul. 3, 2013, 2 pgs.
PCT, Notification Concerning Transmittal of International Preliminary Report on Patentability, Application No. PCT/CA2010/001864, Jun. 6, 2013, 7 pgs.
USPTO, Supplemental Notice of Allowability, U.S. Appl. No. 12/839,622, Jul. 18, 2013, 2 pgs.
USPTO, Supplemental Notice of Allowability, U.S. Appl. No. 12/839,622, Aug. 15, 2013, 2 pgs.
CIPO, Office Action, Application No. 2,746,881, Jun. 7, 2013, 4 pgs.
EPO, Extended Search Report, Application No. 10170152.2, Jan. 19, 2011, 7 pgs.
PCT, International Search Report, Application No. PCT/CA2010/001864, Aug. 3, 2011, 8 pgs.
PCT, Written Opinion of the International Searching Authority, Application No. PCT/US2012/062813, Feb. 28, 2013, 10 pgs.
PCT, Notification Concerning Availability of the Publication of the International Application, Application No. PCT/US2012/062813, May 23, 2013, 1 pg.
USPTO, Office Action, U.S. Appl. No. 12/839,622, Dec. 21, 2012, 7 pgs.
USPTO, Office Action *Ex parte Quayle,* U.S. Appl. No. 12/839,622, Jan. 13, 2013, 6 pgs.
USPTO, Notice of Allowance, U.S. Appl. No. 12/839,622, May 13, 2013, 6 pgs.
USPTO, Notice of Publication of Application, U.S. Appl. No. 13/295,883, May 16, 2013, 1 pg.
International Commission on Non-Ionizing Radiation Protection, "Guidelines for Limiting Exposure to Time-Varying Electric, Magnetic, and Electromagnetic Fields (Up to 300 GHz)," ICNIRP Guidelines, Health Physics Society, Apr. 1998, vol. 74 Issue 4, 31 pgs.
Rich, Nathaniel, "For Whom the Cell Tolls, Why Your Phone May (or May Not) Be Killing You," Harper's Magazine, May 2010, 12 pgs.
Seabury, David, "An Update on SAR Standards and the Basic Requirements for SAR Assessment," ETS-Lingren, Apr. 2005, 8 pgs.
USPTO, Notice of Publication of Application, U.S. Appl. No. 13/898,098, Sep. 26, 2013, 1 pg.
PCT, Notification of Transmittal of the International Preliminary Report on Patentability, Application No. PCT/US2012/062813, Jan. 2, 2014, 13 pgs.
USPTO, Office Action, U.S. Appl. No. 14/278,051, Oct. 8, 2014, 16 pgs.
USPTO, Notice of Allowance, U.S. Appl. No. 13/295,883, Oct. 7, 2014, 24 pgs.

* cited by examiner

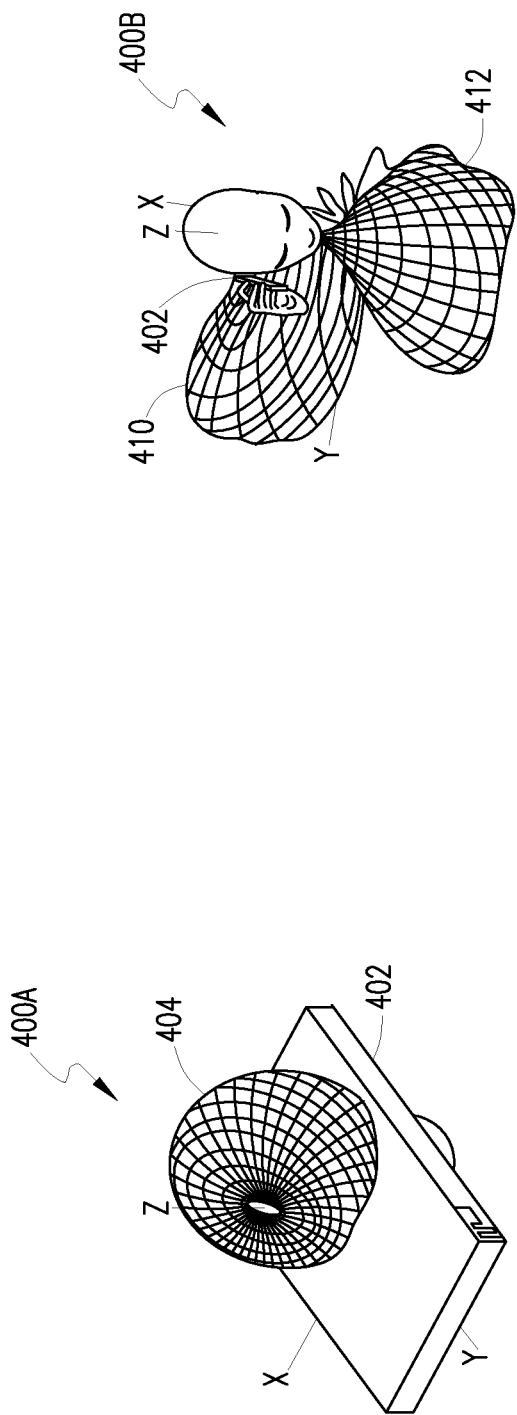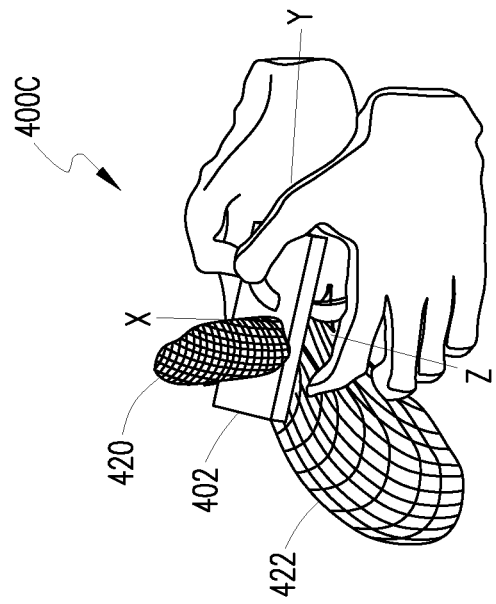

US 8,954,121 B2

RADIATION PATTERN RECOGNITION SYSTEM AND METHOD FOR A MOBILE COMMUNICATIONS DEVICE

CROSS-REFERENCE TO RELATED APPLICATION(S) & CLAIM OF PRIORITY

This application is a National Stage application of and claims the benefit under 35 U.S.C. §371 to International Application No. PCT/CA2010/001864, filed Nov. 26, 2010 having the title "RADIATION PATTERN RECOGNITION SYSTEM AND METHOD FOR A MOBILE COMMUNICATIONS DEVICE", which is hereby incorporated by reference hereto.

FIELD OF THE DISCLOSURE

The present patent disclosure generally relates to wireless communication devices or user equipment (UE) devices, examples of which include mobile handheld devices such as pagers, cellular phones, personal digital assistants (PDAs), smartphones, wirelessly enabled portable computers, and the like. More particularly, and not by way of any limitation, the present patent disclosure is directed to utilizing a radiation pattern recognition scheme for purposes of an antenna application on a wireless communication device.

BACKGROUND

Wireless cellular networks are growing rapidly around the world and this trend is likely to continue for several years. The progress in radio technology enables new and improved services. Wireless services such as, e.g., transmission of voice, fax, data, interactive multimedia services (e.g., video-on-demand) and Internet access are all being supported in today's networks. Wireless networks must provide these services in a wide range of environments, spanning dense urban, suburban, and rural areas. Varying mobility needs as well as achieving secure communications must also be addressed.

Antennas are well known components of a wireless UE device. Currently several advances are being made in the field of antennas used for wireless UE devices. Despite the current advances, additional improvements and enhancements are being constantly pursued.

BRIEF DESCRIPTION OF THE DRAWINGS

A more complete understanding of the embodiments of the present patent disclosure may be had by reference to the following Detailed Description when taken in conjunction with the accompanying drawings wherein:

FIGS. 4A-4C depict example benchmark radiation patterns for an antenna of a wireless UE device for different usage modes;

DETAILED DESCRIPTION OF THE DRAWINGS

Figure 1:
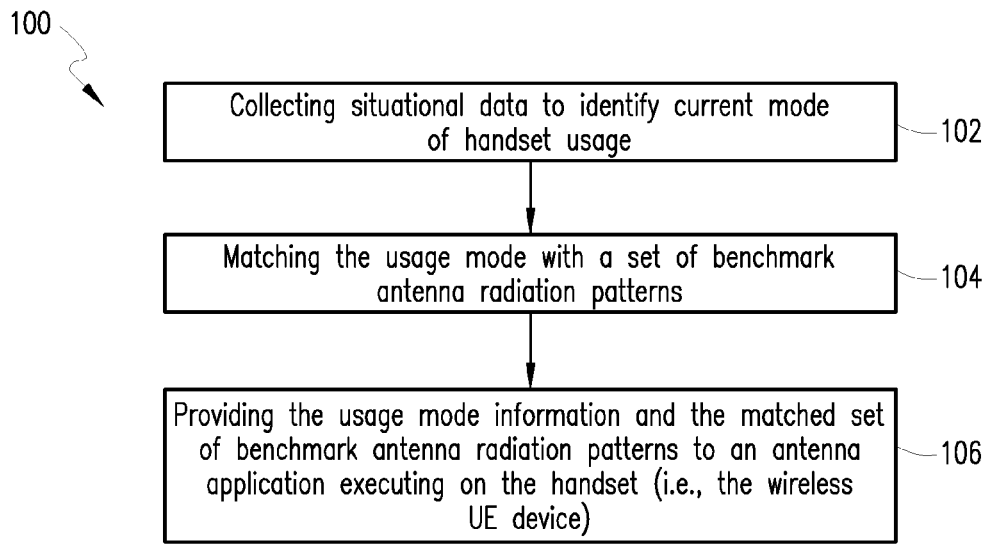
FIG. 1 depicts an example embodiment of a method for purposes of the present patent application.

The present patent disclosure is broadly directed to providing a radiation pattern recognition scheme in a wireless UE device for purposes of an antenna application whereby the performance of the device may be improved. In one example implementation, a "smart antenna" application may be provided with the wireless UE device wherein one or more smart antennas of the UE device may be configured to recognize the environment in which the UE device is operating and accordingly adapt the performance of the UE device.

In one aspect, an embodiment of a method operable on a wireless UE device is disclosed. The embodiment comprises one or more of the following features or acts: identifying a current usage mode in which the wireless UE device is being used, the wireless UE including one or more antennas adapted for radio communication with a telecommunications network; matching the current usage mode with a set of benchmark radiation patterns associated with each of the one or more antennas; and providing the matched set of benchmark radiation patterns to an antenna application executing on the wireless UE device. In one implementation, the current usage mode of the wireless UE device may be identified by way of using at least a portion of multivariate situational data that is representative of the UE device's environment.

In another aspect, an embodiment of a wireless UE device is disclosed. The embodiment comprises one or more of the following features: means for identifying a current usage mode in which the wireless UE device is being used, the wireless UE having one or more antennas adapted for radio communication with a telecommunications network; means for matching the current usage mode with a set of benchmark radiation patterns associated with each of the one or more antennas; and an antenna application module configured to use the matched set of benchmark radiation patterns, whereby the antenna application module may optimize the performance of the wireless UE device, for example, by providing enhanced signal selectivity and directivity.

The present patent application also discloses an additional embodiment of a wireless UE device that comprises one or more of the following features: one or more antennas adapted for radio communication with a telecommunications network; a memory comprising a database of benchmark radiation patterns for each of the one or more antennas in one or more usage modes associated with the wireless UE device; and processor configured to execute an antenna application process for optimizing the wireless UE device performance based at least in part upon using the set of benchmark radiation patterns indicative of the environment in which the wireless UE device is operating. For example, the antenna application may be configured to optimize the antenna itself (i.e., optimizing the antenna performance), the data processing, the process that selects the antenna or antennas, the process that controls appropriate modulation and coding schemes (MCS), or the process that controls transmit power levels, or any combination thereof.

Embodiments of systems, methods, apparatuses and associated tangible computer-readable media having instructions and tangible computer program products, where applicable, relating to radiation pattern recognition by a wireless UE device for purposes of an antenna application process according to the teachings the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring to the drawings, and more particularly to FIG. 1, depicted therein is an example embodiment of a scheme 100 of the present patent application wherein a set of benchmark radiation patterns based on a usage mode associated with the wireless UE device may be provided to an antenna application process executing on the wireless UE device. For purposes of the present patent application, the wireless UE device may comprise any mobile communications device or a mobile terminal or station that is adapted to operate in a diversified radio network environment comprised of one or more networks deployed by respective operators using any known or heretofore unknown technologies, for example, including but not limited to wide area cellular networks, WiFi networks, Wi-MAX networks, television (TV) broadcast networks, satellite communications networks, and the like. Further, radio frequencies utilized in the diverse network technologies may comprise different licensed spectral bands, unlicensed spectral bands, shared or pooled radio frequencies, other lightly licensed bands, fixed TV white space bands, and so on. Furthermore, the wireless UE device may be adapted to operate in a packet-switched mode, circuit-switched mode, or both, using radio frequencies compatible with Global System for Mobile Communications (GSM) networks, Enhanced Data Rates for GSM Evolution (EDGE) networks, Integrated Digital Enhanced Networks (IDEN), Code Division Multiple Access (CDMA) networks, Universal Mobile Telecommunications System (UMTS) networks, any 2nd- 2.5- 3rd- or subsequent Generation networks, Long Term Evolution (LTE) networks (i.e., Enhanced UMTS Terrestrial Radio Access or E-UTRA networks), networks capable of High Speed Downlink Packet Access (HSDPA) or High Speed Uplink Packet Access (HSUPA), or wireless networks employing standards such as Institute of Electrical and Electronics Engineers (IEEE) standards, like IEEE 802.11a/b/g/n standards or other related standards such as HiperLan standard, HiperLan II standard, Wi-MAX standard, OpenAir standard, and Bluetooth standard, as well as any mobile satellite communications technology such as Geo Mobile Radio (GMR)-1, and other satellite-based technologies, e.g., GPS. Accordingly, an example wireless UE device for purposes of the present patent disclosure may include one or more antennas configured to effectuate radio communication with any telecommunications network such as those set forth in hereinabove.

As illustrated in block 102, scheme 100 comprises identifying a current usage mode in which the handset (i.e., the wireless UE) device is being used based on collecting what may be referred to as "situational data". By way of illustration, such situational data may include but not limited to the wireless UE device's orientation, proximity to a user of the wireless UE device, motion or movement associated with the wireless UE device, indication of usage of a keypad of the wireless UE device, indication of usage of a touch screen of the wireless UE device, indication of usage of a speaker and/or a microphone of the wireless UE device, location of the wireless UE device, location of any impediments relative to the wireless UE device (e.g., a user's hands, etc.), location of obstructions such as tunnels, trees, tall buildings, topographic features affecting radio communications, etc., indication of usage of a short-range radio frequency communication subsystem of the wireless UE device (e.g., Bluetooth communications or WiFi communications, etc.), global positioning information, identification of one or more radio access technologies (RATs) being used by the wireless UE device, signal/interference levels associated with radio channels corresponding to the RATs, channel loadings, and the like.

Appropriate hardware, software and/or firmware components may be provided with the wireless UE device that are configured for collecting one or more pieces of the foregoing situational data in any combination. For example, an accelerometer may be provided that detects movement of the wireless UE device in one or more axes of the device. In one embodiment, the X axis may be defined along the width of the wireless UE device, with positive values in the right hand direction; the Y axis may be defined along the length of the wireless UE device, with positive values on the "down" direction; and the Z axis along the depth of the wireless UE device, i.e., going through the body or screen of the device. Such an accelerometer may detect movement in the three axes by sensing small voltage changes that occur in the accelerometer during movement in each of the three axes. The voltage changes may then be processed to determine or estimate whether a user of the wireless UE device is walking, cycling, running, in a car, etc. Such information may then be processed in conjunction with other collected situational data to determine, identify or otherwise estimate a usage mode of the wireless UE device. By way of illustration, if the user is walking and watching a video, then it may be predicted, expected, estimated or otherwise determined with a level of likelihood that the user is holding the UE device in his hand and watching the video. However, if the user is cycling and listening to online music, it is more likely that the UE device is in a usage mode where the device is in the user's pocket or on his arm or on his body in a holder, holster or a clip and the like.

Another component that may be provided in the wireless UE device with respect to collecting the situational data is a gyroscope that may be used to determine the device orientation by measuring the angular movements along any of the three axes. When a sensing element of the gyroscope shakes or tilts, the gyroscope changes the level whereby a corresponding voltage change is generated. The voltage changes may then be used to calculate the angle/orientation of a moving object. For purposes of the present disclosure, any appropriate type of gyroscopes may be used for determining orientation, e.g., electromechanical gyroscopes, electronic or solid-state gyroscopes, laser gyroscopes, micro-electro mechanical systems (MEMS) gyroscopes, and the like. Regardless of the type of gyroscopes used, the angular orientation of the wireless UE device may be referenced to a universal coordinate system. Based on such situational data, an appropriate process executing on the wireless UE device may be used to determine or otherwise estimate how/whether the UE device is held or oriented in a particular fashion.

Other components and techniques, e.g., motion sensors, proximity sensors, location sensors, biometry-based sensors, thermal sensors, tactile sensors, optical sensors, etc. may also be provided in the wireless UE device for collecting one or more pieces of the situational data. Such techniques, for example, may be adapted to provide an indication of whether one or more subsystems of the wireless UE device are being used, such as, the keypad, speaker/microphone, short-range communication system, etc., in addition to collecting information relative to the physical environment in which the wireless UE device is placed.

Based on the foregoing, accordingly, a multivariate collection of situational data may be used for identifying or otherwise estimating a current usage mode of the wireless UE device. It will be apparent to one skilled in the art that any number of usage modes may be defined for a wireless UE device based on the way the device is contemplated for use. By way of illustration, such usage modes may include but not limited to: a voice call mode, a video call mode, a data session mode, a multimedia call mode, a Voice over Internet Protocol (VoIP) mode, a speakerphone mode, a mode of positioning the wireless UE device near a user's ear, a mode of placing the wireless UE device in a user's holster, a mode of placing the wireless UE device in a cradle, a mode of placing the wireless UE device in a holder, a mode of placing the wireless UE device on a clip, a WiFi use mode, a Bluetooth use mode, and a mode of placing the wireless UE device at a place positioned away from a user's body, and the like. Additional usage mode scenarios may be holding the device in front of a user's body with two hands, holding the device to a side of the user's head with a particular hand (e.g., the left hand), holding the device to a side of the user's body in the right hand, the device placed in a pocket of the user's clothing, the device being docked in a car pod, and the like. Accordingly, a usage mode estimator executing on the wireless UE device may use any heuristic, probabilistic, deterministic, rule-based, fuzzy-logic-based, or learning-based process that can synthesize the multivariate situational data and arrive at a usage mode determination or identification.

Continuing to refer to FIG. 1, upon identifying a particular usage mode that the wireless UE device is in, the scheme 100 further involves matching the current usage mode with a set of benchmark radiation patterns associated with each of the antennas of the wireless UE device as set forth in block 104. In one embodiment, such benchmark radiation patterns may be predetermined by a manufacturer of the device for each of the antennas and the usage modes that the device is expected to operate in. As is well known, a radiation pattern of an antenna describes the relative strength of the radiated field in various directions from the antenna at a distance. The radiation pattern is a reception pattern as well, since it also describes the receiving properties of the antenna. That is, the radiation pattern of an antenna is the same whether the antenna is used in transmission (i.e., transmit mode or uplink mode) or reception (i.e., receive mode or downlink mode). This property is generally referred to as reciprocity. Accordingly, for purposes of the present patent disclosure, there will be no distinction made as between the transmit mode radiation patterns and receive mode radiation patterns of an antenna unless otherwise specifically noted. As such, the teachings of the present disclosure are equally applicable to transmit mode radiation patterns as well as receive mode radiation patterns, mutatis mutandis.

In general, a radiation pattern is measured as the variation of the field intensity of an antenna as an angular function and may be shown in a graphical representation of the distribution of radiation from the antenna as a function of angle. The radiation pattern is three-dimensional in the horizontal or vertical planes, wherein the pattern measurements may be presented in either a rectangular or a polar format. The radiation pattern can also be represented by the collection of a number of two-dimensional radiation patterns in the elevation dimension. As will be further described in detail below, the radiation patterns associated with each antenna of a wireless UE device may be measured or otherwise determined on a usage mode by usage mode basis.

After the radiation patterns corresponding to a current usage mode have been identified, the identified set of benchmark radiation patterns may be provided to an antenna application executing on the wireless UE device for purposes of optimizing the overall antenna performance of the UE device (block 106). In a further variation, additional data such as information pertaining to the usage mode, antenna parametric data, Specific Absorption Rate (SAR) values of the antennas, etc. may also be provided to the intended antenna application. For example, antenna parametric data may comprise radiation efficiency, directivity, gain, impedance, reflection coefficients, quality factor, peak/average power, bandwidth, and the like. The antenna application running on the wireless UE device may therefore incorporate or use such radiation pattern data and additional data to function as a "smart" antenna application that can enhance the radio communication capabilities of the wireless UE device. By way of illustration, the antenna application may be one of a beam forming process, a beam steering process, an antenna selection process for a multi-input and multi-output (MIMO) antenna application, an antenna selection process for a weighted multi-antenna process, a least-mean-squares (LMS) weighting process, a recursive least squares (RLS) weighting process, a constant modulus weighting process, a constant modulus weighting process, and a genetic adaptive antenna selection process. For example, the antenna application may therefore determine appropriate weights (i.e., amplitudes and phases of different antenna elements) for forming a beam with most of the radiation energy in one preferred direction (i.e., the main lobe) while minimizing any side lobes. In another example, an antenna selection process may be implemented such that only those antennas whose SAR values satisfy applicable regulatory and environmental safeguards may be used for beam forming or beam steering. In yet another example, the antenna application may be configured to optimize transmit power levels, reduce bit error rates (BERs), and the like, in conjunction with appropriate modulation and coding schemes (MCS).

Figure 2:
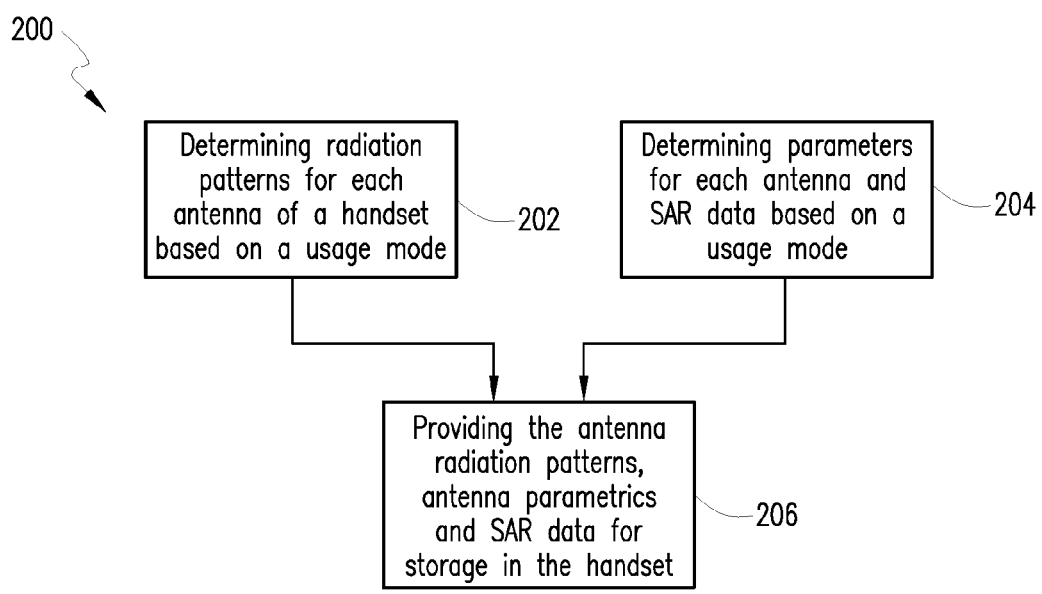
FIG. 2 depicts an example embodiment of another method for purposes of the present patent application.

FIG. 2 depicts an example embodiment of a method 200 whereby a wireless UE device may be provided that is configured for radiation pattern recognition for purposes of the present patent application. For example, a device manufacturer or a third-party provider may measure or otherwise determine radiation patterns for each antenna of a mobile handset (i.e., a wireless UE device) on a usage mode basis (block 202). Additionally, various parametric data and SAR values associated with each antenna in each usage mode may be measured or otherwise determined (block 204). In one implementation, measured radiation patterns and the parametric data may be stored in the wireless UE device (e.g., in a nonvolatile memory) (block 206). In another implementation, such information may be pushed (e.g., post-manufacture) to the wireless UE device by a network node which may be a website of the wireless UE device's manufacturer, a base station of a telecommunications network (e.g., a GSM network), an eNB node of a telecommunications network (e.g., an LTE network), or a trusted device management node configured to update the wireless UE device's software/firmware.

Figure 3A:
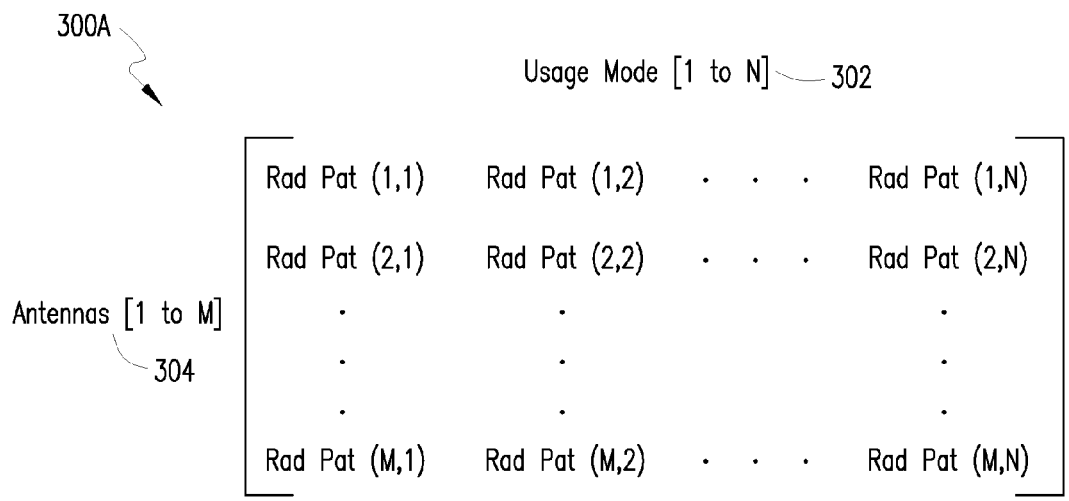
FIGS. 3A and 3B depict example data representations relative to benchmark radiation patterns and SAR parametrics for each antenna and each usage mode of a mobile communications device (also referred to as a wireless user equipment (UE) device) according to an embodiment of the present patent application.
Figure 3B:
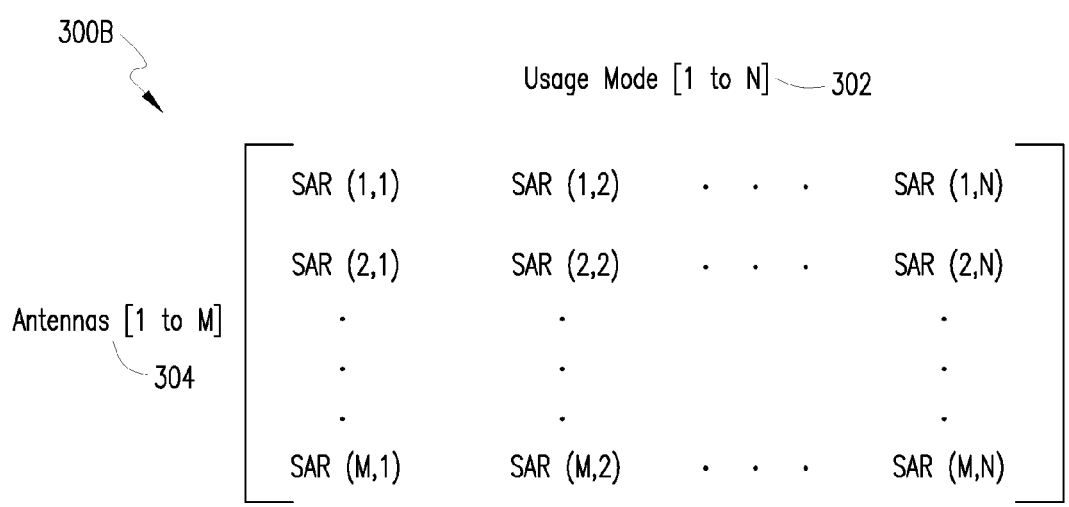

FIGS. 3A and 3B depict example data representations relative to benchmark radiation patterns and SAR parametrics for each antenna and each usage mode of a mobile communications device (i.e., a wireless UE device) according to an embodiment of the present patent application. Reference numeral 300A refers to a representation of radiation patterns for a plurality of antennas of a wireless UE device that is contemplated for use in a plurality of usage modes. Reference numeral 302 refers to N usage modes whereas reference numeral 304 refers to M antennas. Accordingly, radiation pattern data for such a scenario can theoretically comprise M×N patterns, which data can be provided in a number of ways and granularities. For example, the radiation pattern data may be stored as figures or pictures, either 3-D or 2-D representations of polar or rectangular formats. The radiation pattern data may be sub-sampled data or full pattern data, depending on storage requirements and capabilities. By way of example, Rad Pat (1,1) refers to the radiation pattern measured for antenna 1 in usage mode 1. Likewise, Rad Pat (M,N) refers to the radiation pattern measured for antenna M in usage mode N. Accordingly, if a particular usage mode I is identified or otherwise estimated for the wireless UE device based on the collected situational data, a set of M radiation patterns {Rad Pat (1,I); Rad Pat (2,I), . . . , Rad Pat (M,I)} may be provided as an input to a smart antenna application executing on the wireless UE device.

Reference numeral 300B refers to a representation of SAR data associated with a plurality of antennas of a wireless UE device that is contemplated for use in a plurality of usage modes. Analogous to FIG. 3A, representation 300B in FIG. 3B refers to a scenario where N usage modes are contemplated for a UE device having M antennas. By way of example, SAR (1,1) refers to the SAR value associated with antenna 1 in usage mode 1. Likewise, SAR (M,N) refers to the SAR value for antenna M in usage mode N. Accordingly, if a particular usage mode J is identified or otherwise estimated for the wireless UE device based on the collected situational data, a set of M SAR values {SAR (1,J); SAR (2,J), . . . , SAR (M,J)} may also be provided as an input to a smart antenna application executing on the wireless UE device. Additionally, as alluded to previously, out of the M antennas, a subset of antennas may have SAR values that may be greater than allowed limits and therefore may not be considered for an antenna application.

Those skilled in the art will recognize that not all M×N radiation patterns or M×N SAR values may be populated since such data may be inapplicable for certain usage modes. Further, where the UE device determines its usage mode dynamically and transmits such information to a network node, only applicable radiation patterns, SAR values and other antenna parametrics may be downloaded for use with an antenna application. In a further variation, if an estimated usage mode is not exactly matched to any predetermined usage modes, an extrapolated set of radiation patterns may be determined based on the usage mode that is closest to the estimated usage mode. In a still further variation, a wireless UE device may build its internal radiation pattern library as and when it identifies a new usage mode, whereupon applicable radiation pattern data may be downloaded to the device.

FIGS. 4A-4C depict example benchmark radiation patterns for a particular antenna of a wireless UE device 402 for different usage modes. Reference numeral 400A in FIG. 4A refers to a free space antenna radiation pattern associated with the wireless UE device 402 that may be applicable in a usage mode wherein the UE device 402 is positioned on a flat surface at a position away from the user. Reference numeral 404 refers to the main lobe of the radiation pattern along the Z-axis of the device 402. Reference numeral 400B in FIG. 4B refers to an antenna radiation pattern is a voice usage scenario with specific touch and elevation angles with respect to the device 402. Reference numerals 410 and 412 refer to two predominant lobes of radiation for this particular usage mode. Reference numeral 400C in FIG. 4C refers to an antenna radiation pattern in a data session mode for a specific hand grip and elevation angle with respect to the device 402. Reference numerals 420 and 422 refer to two predominant lobes of radiation for this usage mode. Similar to the three radiation patterns shown in FIGS. 4A-4C, other radiation patterns may be measured or otherwise determined with respect to other usage modes for each and every antenna of a wireless UE device.

Figure 5:
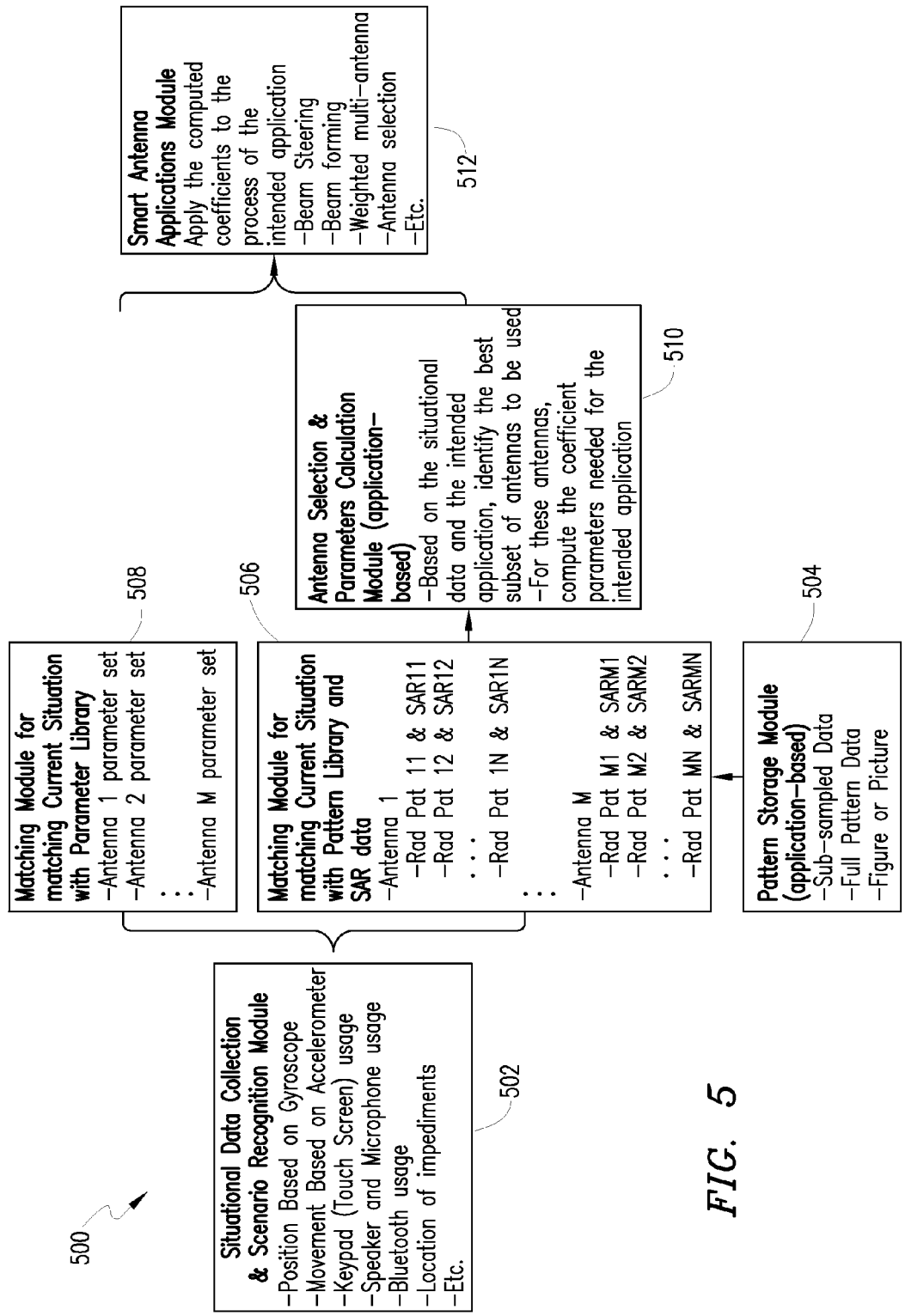
FIG. 5 depicts an example embodiment of a radiation pattern recognition scheme and use thereof for a smart antenna application.

Referring now to FIG. 5, depicted therein is an example embodiment of a radiation pattern recognition scheme 500 and use thereof for a smart antenna application. A situational data collection and usage scenario recognition module 502 is configured to collect multivariate situational data as described hereinabove. A pattern storage module 504 is configured to store radiation pattern data in different formats and at different levels of granularity depending on the application. A matching module 506 (e.g., a first matching module) is configured to match the current usage mode/situation with a pattern library and SAR data. Based on the usage/situational data and the particular type of antenna application to be used, an optimum subset of antennas may be determined by an antenna selection and parametric calculation module 510. Additionally, for the selected subset of antennas, various weights or coefficients may be calculated depending on the intended antenna application. Alternatively or additionally, another matching module 508 (e.g., a second matching module) is configured to match the current usage mode/situation determined by the scenario recognition module 502 with a parameter library, e.g., on the wireless UE device. The parameter library may include for each antenna a set of parametric data that may comprise various antenna parameters including the weights/coefficients. A smart antenna application module 512 may receive the output generated by the antenna selection and parametric calculation module 510 or the matched antenna parameters as well as the radiation pattern data to apply in an intended antenna application algorithm or process such as, e.g., beam steering, beam forming, multi-antenna weighting, adaptive antenna selection, switched-beam application, etc. as described hereinabove.

It should be appreciated that for a selected usage scenario determined by the usage scenario recognition module 502, two implementations may be provided based on whether a parameter library search (e.g., performed by module 508) is performed in conjunction with a pattern library search (e.g., performed by module 506) or not for a designated smart antenna application. One implementation is to identify the best antenna or set of antenna elements to use from the pattern library search. For example, such identification may include elements integrated into the front, back, top or sides of a wireless UE device or it may include external antenna elements (e.g., built into a car frame or associated with a remote (e.g., Bluetooth) speaker), or both. The identification can also be based on measured SAR values. That is, certain antennas may have to be disabled when used next to the user's head as they may exceed the SAR limit. However, such antennas can be used in the data mode or next to the body. A calculation may be performed to determine (e.g., actual computations or via a look-up table) the set of parameters (antenna element weights) needed to realize the desired radiation pattern over the selected antenna elements or to realize the specific smart antenna application objective. Accordingly, a straightforward pattern library search may be used if the computational load on the wireless device for calculating the parameters for the designated smart antenna application is not severe. In another implementation, instead of computing antenna parameters on the wireless UE device, a pre-calculated antenna parameters stored on the handset may be used for some applications, for example, as part of the matching process of module 508. This implementation may be beneficial if the applicable antenna weights/parameters are environment-independent and therefore can be obtained beforehand. As a result, the pre-stored antenna parameter library implementation may offer a faster solution where the intended smart antenna application is computationally expensive. Regardless of which implementation is used, the set of antenna element weighting parameters may be provided as an input to an antenna application for achieving the desired antenna radiation pattern using the selected set of antenna elements.

Figure 6:
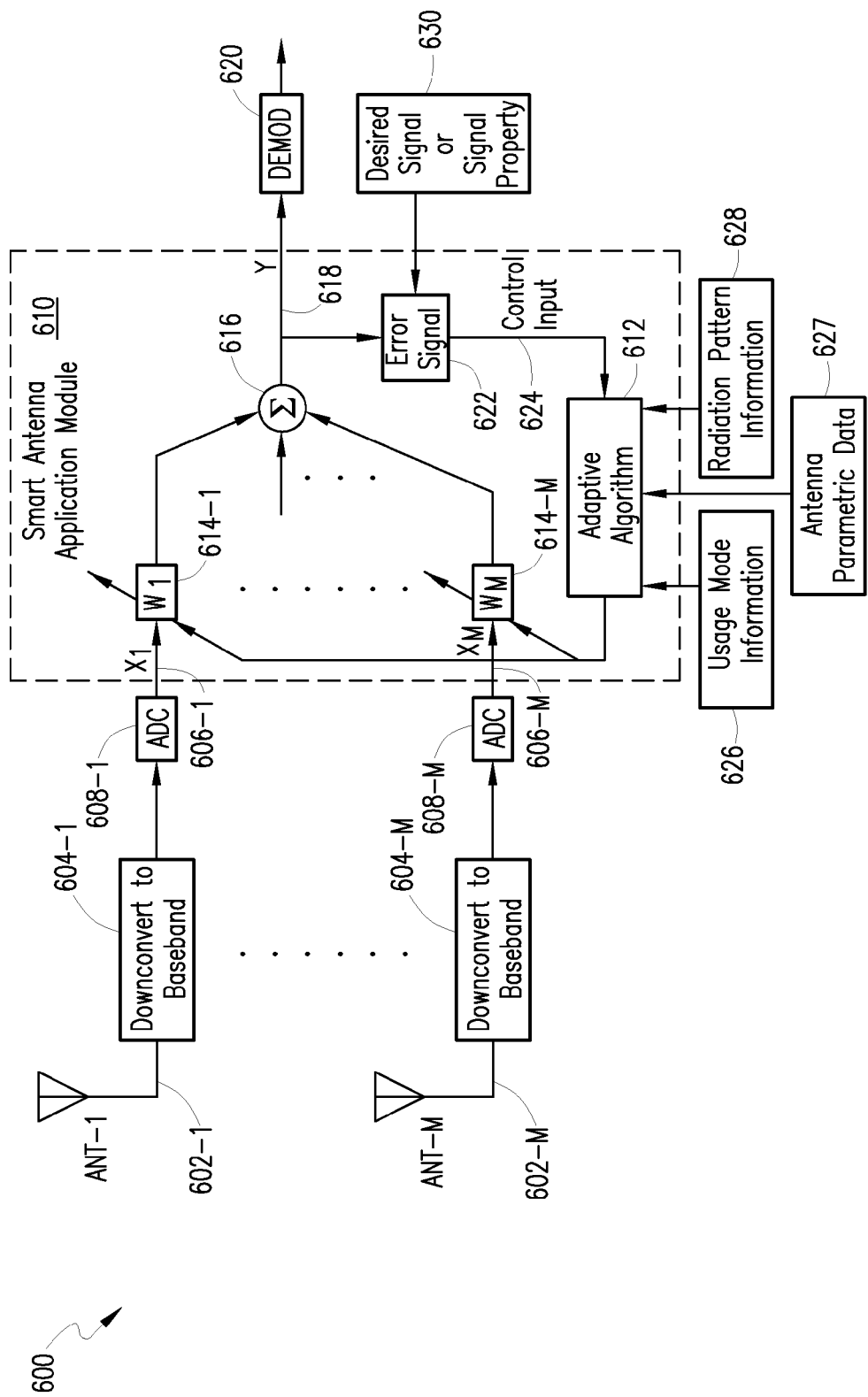
FIG. 6 depicts an example embodiment of a portion of a wireless UE device that may be configured to use radiation pattern information, usage mode information, antenna parametrics, etc. as part of a smart antenna application.

FIG. 6 depicts an example embodiment of a portion 600 of a wireless UE device that may be configured to use radiation pattern information, usage mode information, antenna parametrics, etc. as part of a smart antenna application. By way of example, the embodiment illustrated in FIG. 6 is directed to employing a smart antenna application in the receive mode operation. However, as discussed in previous sections, a similar embodiment may be employed in the transmit mode operation of the wireless UE device as well. A plurality of antennas 602-1 through 602-M are each connected to a respective converter 604-1 through 604-M for down-converting the received radio signals to appropriate outputs, which are then sampled and digitized via analog-to-digital converters (ADC) 608-1 through 608-M. It should be appreciated that the various RF signal processing elements (e.g., converters 604-1 to 604-M and ADCs 608-1 to 608-M) may be implemented in hardware as one or more circuits depending on the implementation. Regardless of the exact hardware implementation, however, the RF signal processing is configured to yield signal outputs $X_1$ to $X_M$ 606-1 to 606-M that are provided to a smart antenna application module 610, such as, e.g., a beam former. Signals $X_1$ to $X_M$ 606-1 to 606-M typically contain both the desired signal and the interfering signals, which may be appropriately scaled by a set of complex gain parameters $W_1$ to $W_M$ 614-1 to 614-M (also referred to as a gain vector or weight vector). A combiner 616 is configured to combine the weight vector parameters $W_1$ to $W_M$ 614-1 to 614-M with signals $X_1$ to $X_M$ 606-1 to 606-M to generate an array output signal Y 618. In operation, output signal Y 618 is provided to a demodulator 620 to provide an appropriate signal to the remainder of the wireless UE device (e.g., for further processing in the upper layers).

The array output Y 618 from the combiner 616 may also be compared with a desired signal or signal property, that is, a reference signal 630, in an error signal generator 622 to generate an error signal 624 that is operable as a control input. An adaptive process 612 may be configured to adaptively minimize the error signal 624 and thereby change or modulate the weight vectors $W_1$ to $W_M$ 614-1 to 614-M according to some max/min criteria. Such modulated weight vectors $W_1$ to $W_M$ 614-1 to 614-M may be fed back to combine with signals $X_1$ to $X_M$ 606-1 to 606-M for modulating the scaling process. Additionally, the adaptive process 612 may also receive usage/scenario mode information 626, matched radiation pattern information 628 as well as SAR and antenna parametrics (including, e.g., known antenna weights or coefficients) 627 to further refine the scaling process.

Figure 7:
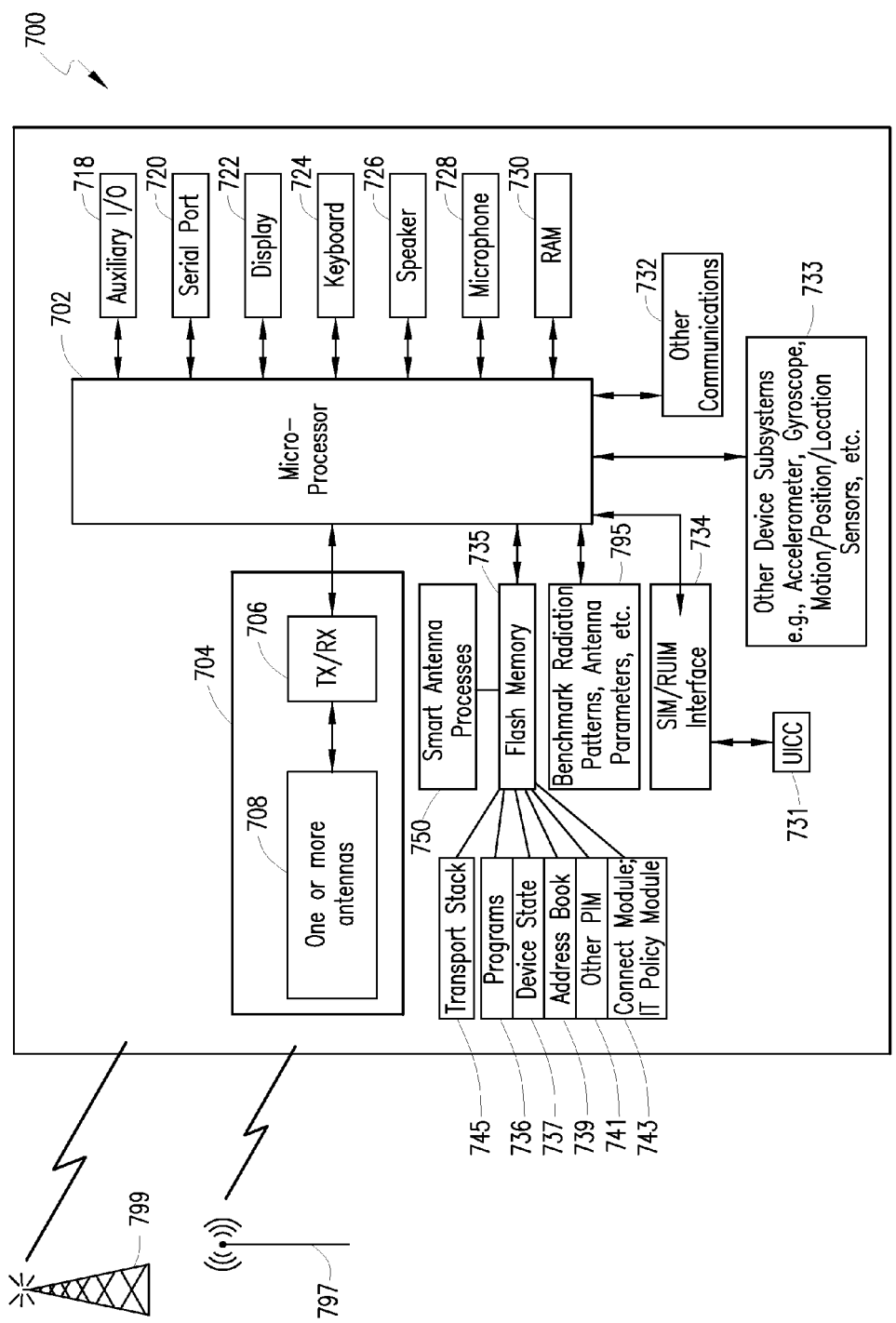
FIG. 7 depicts a block diagram of an example wireless UE device according to one embodiment of the present patent application.

FIG. 7 depicts a block diagram of an example wireless UE device 700 according to one embodiment of the present patent application. Wireless UE device 700 may be provided with a communication subsystem 704 that includes an antenna assembly 708 (with one or more antennas), suitable transceiver circuits 706 operable with one or more RATs, as well as additional hardware/software components such as, e.g., signal processors, A/D and D/A converters, oscillators, and the like. A microprocessor 702 providing for the overall control of the device 700 is operably coupled to the communication subsystem 704 that can operate with various access technologies, operating bands/frequencies and networks (for example, to effectuate multi-mode communications in voice, data, media, or any combination thereof). As will be apparent to those skilled in the field of communications, the particular design of the communication subsystem/module 704 may be dependent upon the communications network(s) with which the device is intended to operate, e.g., as exemplified by infrastructure elements 799 and 797.

Microprocessor 702 also interfaces with additional device subsystems such as input/output (I/O) 718, serial port 720, display 722, keyboard or keypad 724, speaker 726, microphone 728, random access memory (RAM) 730, other communications facilities 732, which may include for example a short-range communications subsystem, and any other device subsystems generally labeled as reference numeral 733. Example additional device subsystems may include accelerometers, gyroscopes, motion sensors, location sensors, temperature sensors, and the like that are configured to facilitate collection of multivariate situational data. To support access as well as authentication and key generation, a SIM/USIM interface 734 (also generalized as a Removable User Identity Module (RUIM) interface) is also provided in communication with the microprocessor 702 and a UICC 731 having suitable SIM/USIM applications.

Operating system software and other system software may be embodied in a persistent storage module 735 (i.e., nonvolatile storage subsystem) which may be implemented using Flash memory or another appropriate memory. In one implementation, persistent storage module 735 may be segregated into different areas, e.g., transport stack 745, storage area for computer programs 736, as well as data storage regions such as device state 737, address book 739, other personal information manager (PIM) data 741, and a connect module manager including an IT policy module as well as other data storage areas generally labeled as reference numeral 743. Additionally, the persistent memory may include appropriate software/firmware 750 necessary to effectuate one or more radio channel sensing operations, filtering, usage mode estimation, radiation pattern/parameter matching, and smart antenna application processes, etc., in conjunction with one or more subsystems set forth herein under control of the microprocessor 702 or specialized circuitry. Powered components may receive power from any power source (not shown in FIG. 7). The power source may be, for example, a battery, but the power source may also include a connection to power source external to wireless UE device 700, such as a charger. Further, an onboard storage module or a removal storage module 795 may be provided as a database for storing benchmark radiation pattern data (i.e., pattern library), antenna parameters (i.e., parameter library), and the like for purposes of effectuating radiation pattern recognition as set forth in the present patent disclosure.

Based on the foregoing description, it should be realized that in an example embodiment of the present disclosure, appropriate situational data collection may be carried using known and or heretofore unknown techniques. Once a usage mode is identified based on the collected situational data, a search in a data library may begin, wherein the data library may comprise pre-stored antenna radiation patterns and pre-calculated antenna parameters. The pattern library portion may contains M×N pre-measured radiation patterns wherein each describes the pattern of one of the antennas in a given usage scenario. The data in the pattern library can be stored in different formats depending on the smart antenna application for which the radiation pattern recognition techniques may be used. Examples of such formats may comprise detailed high-resolution data, sub-sampled data, pattern figures or pictures, etc. The antenna parameters library portion may contain pre-calculated antenna parameters for a given antenna application if such antenna application is computationally prohibitive. Such a parametric library may serve as an alternative to the pattern library, in one variation, and may offer more efficient solutions for certain computationally expensive antenna applications. The data search processes are configured to be responsive to recognizing the environment in which a UE device is operating and, accordingly, the matching processes are operative to select the "best" antennas and patterns that best match the mode in which the UE device is functioning. Such added intelligence is configured to enhance a select antenna application to perform its designated function. Those skilled in the art will further recognize that added intelligence for smart antenna applications in state-of-the-art 4G technologies can enhance the capabilities of the mobile device and associated cellular system, whereby faster bit rates, reduction in multi-user interference, increase in range, multi-path mitigation, and reduction of errors due to multi-path fading, etc. may be achieved. Additionally, radio communications may be rendered highly secure because the radio signals transmitted by a smart antenna with enhanced signal selectivity and directivity cannot be easily tracked or received by other antennas.

Various processes, structures, components and functions set forth above in detail, in particular associated with usage/scenario identification processes, radiation pattern recognition and matching processes, and antenna application processes and sub-processes thereof may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in non-transitory computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A method operable on a wireless user equipment (UE) device, said method comprising:
   identifying a current usage mode in which said wireless UE device is being used, said wireless UE having one or more antennas for radio communication with a telecommunications network;
   matching said current usage mode with a set of benchmark radiation patterns associated with each of said one or more antennas;
   determining a set of antenna parameters based on said current usage mode;
   matching said current usage mode with a set of Specific Absorption Rate (SAR) parameters associated with each of said one or more antennas in said current usage mode; and
   providing said matched set of benchmark radiation patterns, said antenna parameters and said SAR parameters to an antenna application executing on said wireless UE device.

2. The method of claim 1 wherein said current usage mode is identified by collecting situational data that comprises at least one of said wireless UE device's orientation, proximity to a user of said wireless UE device, motion associated with said wireless UE device, indication of usage of a key pad of said wireless UE device, indication of usage of a touch screen of said wireless UE device, indication of usage of a speaker and a microphone of said wireless UE device, location of said wireless UE device, location of impediments relative to said wireless UE device, indication of usage of a short-range radio frequency communication subsystem of said wireless UE device, global positioning information, identification of one or more radio access technologies (RATs) being used by said wireless UE device, and interference levels associated with radio channels corresponding to said RATs.

3. The method of claim 2 wherein at least a portion of said situational data is determined by an accelerometer of said wireless UE device.

4. The method of claim 2 wherein at least a portion of said situational data is determined by a gyroscope of said wireless UE device.

5. The method of claim 1 wherein said current usage mode comprises at least one of: a voice call mode, a video call mode, a data session mode, a multimedia call mode, a Voice over Internet Protocol (VoIP) mode, a speakerphone mode, a mode of positioning said wireless UE device near a user's ear, a mode of placing said wireless UE device in a user's holster, a mode of placing said wireless UE device in a cradle, a mode of placing said wireless UE device in a holder, a mode of placing said wireless UE device on a clip, a WiFi use mode, a Bluetooth use mode, and a mode of placing said wireless UE device at a place positioned away from a user's body.

6. The method of claim 1 wherein said matching said current usage mode with a set of benchmark radiation patterns comprises comparing said usage mode against a database of radiation patterns that are determined for each of said one or more antennas in a plurality of usage modes.

7. The method of claim 6 wherein said database of radiation patterns is stored locally on said wireless UE device.

8. The method of claim 6 wherein said database of radiation patterns is at least one of updated and pushed to said wireless UE device by a network node comprising one of a website of said wireless UE device's manufacturer, a base station of said telecommunications network, an eNB node of said telecommunications network, and a trusted device management node.

9. The method of claim 6 wherein said database of radiation patterns comprises a plurality of transmit mode radiation patterns.

10. The method of claim 6 wherein said database of radiation patterns comprises a plurality of receive mode radiation patterns.

11. The method of claim 1 wherein said one or more antennas are adapted for radio communication using a radio access technology selected from IEEE 802.11a technology, IEEE 802.11b technology, IEEE 802.11g technology, IEEE 802.11n technology, GSM/EDGE Radio Access Network (GERAN) technology, Universal Mobile Telecommunications System (UMTS) technology, Evolution—Data Optimized (EVDO) technology, Code Division Multiple Access (CDMA) technology, Time Division Multiple Access (TDMA) technology, Long-Term Evolution (LTE) technology, HiperLan technology, HiperLan II technology, Wi-MAX technology, OpenAir technology, Bluetooth technology, and GMR-1 technology.

12. The method of claim 1 wherein said antenna application comprises at least one of a beam forming process, a beam steering process, an antenna selection process for a multi-input and multi-output (MIMO) antenna application, an antenna selection process for a weighted multi-antenna process, a least-mean-squares (LMS) weighting process, a recursive least squares (RLS) weighting process, a constant modulus weighting process, a constant modulus weighting process, and a genetic adaptive antenna selection process.

13. The method of claim 1 wherein said set of antenna parameters are determined by searching a parameter library.

14. The method of claim 1 wherein said set of antenna parameters are determined by computing based on said antenna application.

15. A wireless user equipment (UE) device comprising:
means for identifying a current usage mode in which said wireless UE device is being used, said wireless UE having one or more antennas for radio communication with a telecommunications network;
means for matching said current usage mode with a set of benchmark radiation patterns associated with each of said one or more antennas;
means for determining a set of antenna parameters based on said current usage mode;
means for matching said current usage mode with a set of Specific Absorption Rate (SAR) parameters associated with each of said one or more antennas in said current usage mode; and
an antenna application module configured to use said matched set of benchmark radiation patterns, said antenna parameters and said SAR parameters for optimizing performance of said wireless UE device.

16. The wireless UE device of claim 15 wherein said means for identifying said current usage mode is responsive to collecting situational data that comprises means for collecting at least one of said wireless UE device's orientation, proximity to a user of said wireless UE device, motion associated with said wireless UE device, indication of usage of a key pad of said wireless UE device, indication of usage of a touch screen of said wireless UE device, indication of usage of a speaker and a microphone of said wireless UE device, location of said wireless UE device, location of impediments relative to said wireless UE device, indication of usage of a short-range radio frequency communication subsystem of said wireless UE device, identification of one or more radio access technologies (RATs) being used by said wireless UE device, and interference levels associated with radio channels corresponding to said RATs.

17. The wireless UE device of claim 16 further comprising at least one of an accelerometer and a gyroscope for collecting at least a portion of said situational data.

18. The wireless UE device of claim 15 wherein said current usage mode comprises at least one of: a voice call mode, a video call mode, a data session mode, a multimedia call mode, a Voice over Internet Protocol (VoIP) mode, a speakerphone mode, a mode of positioning said wireless UE device near a user's ear, a mode of placing said wireless UE device in a user's holster, a mode of placing said wireless UE device in a cradle, a mode of placing said wireless UE device in a holder, a mode of placing said wireless UE device on a clip, a WiFi use mode, a Bluetooth use mode, and a mode of placing said wireless UE device at a place positioned away from a user's body.

19. The wireless UE device of claim 15 wherein said means for matching said current usage mode with a set of benchmark radiation patterns comprises means for comparing said usage mode against a database of radiation patterns that are determined for each of said one or more antennas in a plurality of usage modes.

20. The wireless UE device of claim 19 wherein said database of radiation patterns is stored locally on said wireless UE device.

21. The wireless UE device of claim 19 wherein said database of radiation patterns is at least one of updated and pushed to said wireless UE device by a network node comprising one of a website of said wireless UE device's manufacturer, a base station of said telecommunications network, an eNB node of said telecommunications network, and a trusted device management node.

22. The wireless UE device of claim 15 wherein said one or more antennas are adapted for radio communication using a radio access technology selected from IEEE 802.11a technology, IEEE 802.11b technology, IEEE 802.11g technology, IEEE 802.11n technology, GSM/EDGE Radio Access Network (GERAN) technology, Universal Mobile Telecommunications System (UMTS) technology, Evolution—Data Optimized (EVDO) technology, Code Division Multiple Access (CDMA) technology, Time Division Multiple Access (TDMA) technology, Long-Term Evolution (LTE) technology, HiperLan technology, HiperLan II technology, Wi-MAX technology, OpenAir technology, Bluetooth technology, and GMR-1technology.

23. The wireless UE device of claim 15 wherein said antenna application module is configured to execute at least one of a beam forming process, a beam steering process, an antenna selection process for a multi-input and multi-output (MIMO) antenna application, an antenna selection process for a weighted multi-antenna process, a least-mean-squares (LMS) weighting process, a recursive least squares (RLS) weighting process, a constant modulus weighting process, a constant modulus weighting process, and a genetic adaptive antenna selection process.

24. The wireless UE device of claim 15 wherein said set of antenna parameters are determined by searching a parameter library.

25. The wireless UE device of claim 15 wherein said set of antenna parameters are determined by computing based on said antenna application.

26. A wireless user equipment (UE) device comprising:
one or more antennas adapted for radio communication with a telecommunications network;
a memory comprising a database of benchmark radiation patterns for each of said one or more antennas in one or more usage modes associated with said wireless UE device; and
a processor configured to:
execute instructions for identifying a current usage mode in which said wireless UE device is being used;
execute instructions for matching said current usage mode with a set of benchmark radiation patterns associated with each of said one or more antennas based on querying the database of benchmark radiation patterns;
execute instructions for determining a set of antenna parameters based on said current usage mode;
execute instructions for matching said current usage mode with a set of Specific Absorption Rate (SAR)

parameters associated with each of said one or more antennas in said current usage mode; and execute an antenna application process for optimizing performance of said wireless UE device based at least in part upon using said set of benchmark radiation patterns, said antenna parameters and said SAR parameters.

27. The wireless UE device of claim 26 wherein said one or more antennas are adapted for radio communication using a radio access technology selected from IEEE 802.11a technology, IEEE 802.11b technology, IEEE 802.11g technology, IEEE 802.11n technology, GSM/EDGE Radio Access Network (GERAN) technology, Universal Mobile Telecommunications System (UMTS) technology, Evolution—Data Optimized (EVDO) technology, Code Division Multiple Access (CDMA) technology, Time Division Multiple Access (TDMA) technology, Long-Term Evolution (LTE) technology, HiperLan technology, HiperLan II technology, Wi-MAX technology, OpenAir technology, Bluetooth technology, and GMR-1technology.

28. The wireless UE device of claim 26 wherein said antenna application process comprises at least one of a beam forming process, a beam steering process, an antenna selection process for a multi-input and multi-output (MIMO) antenna application, an antenna selection process for a weighted multi-antenna process, a least-mean-squares (LMS) weighting process, a recursive least squares (RLS) weighting process, a constant modulus weighting process, a constant modulus weighting process, and a genetic adaptive antenna selection process.

\* \* \* \* \*